United States Patent
Beringer et al.

(10) Patent No.: US 8,095,411 B2
(45) Date of Patent: Jan. 10, 2012

(54) GUIDED PROCEDURE FRAMEWORK

(75) Inventors: Joerg Beringer, Frankfurt (DE); Cyrille Waguet, Kronau (DE); Michael Hatscher, Osnabrueck (DE); Sabine Wagner, Weinheim (DE); Susanne Lencinas, Berlin (DE); Annette Haeussler, Heidelberg (DE)

(73) Assignee: SAP AG, Walldorf (DE)

( * ) Notice: Subject to any disclaimer, the term of this patent is extended or adjusted under 35 U.S.C. 154(b) by 1553 days.

(21) Appl. No.: 10/657,748

(22) Filed: Sep. 8, 2003

(65) Prior Publication Data
US 2004/0119752 A1 Jun. 24, 2004

Related U.S. Application Data

(60) Provisional application No. 60/436,219, filed on Dec. 23, 2002.

(51) Int. Cl.
*G06Q 10/00* (2006.01)
(52) U.S. Cl. .................... 705/7.23; 705/7.27
(58) Field of Classification Search .............. 705/7.23, 705/7.27
See application file for complete search history.

(56) References Cited

U.S. PATENT DOCUMENTS

| | | |
|---|---|---|
| 5,634,127 A | 5/1997 | Cloud et al. |
| 5,721,906 A | 2/1998 | Siefert |
| 5,754,939 A | 5/1998 | Herz et al. |
| 5,802,499 A * | 9/1998 | Sampson et al. ............. 705/35 |
| 5,826,239 A | 10/1998 | Du et al. |
| 5,870,545 A | 2/1999 | Davis et al. |
| 5,893,074 A | 4/1999 | Hughes et al. |
| 5,899,979 A | 5/1999 | Miller et al. |
| 6,003,011 A * | 12/1999 | Sarin et al. .................. 705/9 |
| 6,052,684 A | 4/2000 | Du |
| 6,078,982 A | 6/2000 | Du et al. |
| 6,167,564 A | 12/2000 | Fontana et al. |
| 6,185,587 B1 | 2/2001 | Bernardo et al. |
| 6,189,003 B1 | 2/2001 | Leal |
| 6,233,600 B1 | 5/2001 | Salas et al. |
| 6,278,977 B1 | 8/2001 | Agrawal et al. |
| 6,297,819 B1 | 10/2001 | Furst |

(Continued)

OTHER PUBLICATIONS

3Com Palm VII Wireless Access Now Available for the Project Gateway Enterprise Project Management System. Business Editors/High-Tech Writers. Business Wire. New York: Oct. 26, 1999 (proquest).*

(Continued)

*Primary Examiner* — Johnna Loftis
(74) *Attorney, Agent, or Firm* — Finnegan, Henderson, Farabow, Garrett & Dunner, LLP

(57) ABSTRACT

Systems and techniques relating to associating a procedure with actions and resources are described. In general, in one implementation, the technique includes: specifying a list of one or more actions corresponding to a specified procedure and, for each action, one or more resources associated with the action; indicating an action order, including indicating whether two or more actions in the action list are to be performed in an order-dependent manner or in an order-independent manner; formatting the list of actions into a presentation format; and enabling a user to access the resources associated with the specified procedure. The actions can be grouped into one or more phases and a navigation model may include a phase indicator to navigate by phases of the procedure and display of actions and deliverables associated with a phase. The techniques can include associating deliverables, contributors and resources with an action. A display can be provided for tracking the status of deliverables, contributors, resources or the completion of the procedure.

59 Claims, 9 Drawing Sheets

U.S. PATENT DOCUMENTS

| | | | | |
|---|---|---|---|---|
| 6,327,628 | B1 | 12/2001 | Anuff et al. | |
| 6,473,751 | B1 | 10/2002 | Nikolovska et al. | |
| 6,484,149 | B1 | 11/2002 | Jammes et al. | |
| 6,636,837 | B1 | 10/2003 | Nardozzi et al. | |
| 6,643,661 | B2 | 11/2003 | Polizzi et al. | |
| 6,668,273 | B1 | 12/2003 | Rust | |
| 6,668,353 | B1 | 12/2003 | Yurkovic | |
| 6,697,865 | B1 | 2/2004 | Howard et al. | |
| 6,820,082 | B1 | 11/2004 | Cook et al. | |
| 6,871,197 | B1 | 3/2005 | Johnson | |
| 6,912,573 | B2 | 6/2005 | Ohkado et al. | |
| 6,915,482 | B2 | 7/2005 | Jellum et al. | |
| 6,950,852 | B1 | 9/2005 | Kobayaghi et al. | |
| 6,959,268 | B1 * | 10/2005 | Myers, Jr. et al. | 703/6 |
| 7,003,546 | B1 | 2/2006 | Cheah et al. | |
| 7,003,550 | B1 | 2/2006 | Cleasby et al. | |
| 7,054,923 | B2 | 5/2006 | Krishnamoorthy | |
| 7,069,511 | B2 * | 6/2006 | Maritzen et al. | 715/733 |
| 7,124,355 | B1 | 10/2006 | Kukkal | |
| 7,139,978 | B2 | 11/2006 | Rojewski et al. | |
| 7,222,369 | B2 | 5/2007 | Vering et al. | |
| 7,277,924 | B1 | 10/2007 | Wichmann et al. | |
| 7,283,951 | B2 | 10/2007 | Marchisio et al. | |
| 7,340,679 | B2 | 3/2008 | Botscheck et al. | |
| 7,392,254 | B1 | 6/2008 | Jenkins | |
| 7,424,438 | B2 | 9/2008 | Vianello | |
| 7,448,046 | B2 | 11/2008 | Navani et al. | |
| 7,711,694 | B2 * | 5/2010 | Moore | 1/1 |
| 2001/0047276 | A1 | 11/2001 | Eisenhart | |
| 2001/0047293 | A1 | 11/2001 | Waller et al. | |
| 2001/0049674 | A1 | 12/2001 | Talib et al. | |
| 2002/0049749 | A1 | 4/2002 | Helgeson et al. | |
| 2002/0052894 | A1 | 5/2002 | Bourdoncle et al. | |
| 2002/0059379 | A1 | 5/2002 | Harvey et al. | |
| 2002/0073114 | A1 | 6/2002 | Nicastro et al. | |
| 2002/0087600 | A1 | 7/2002 | Newbold | |
| 2002/0111787 | A1 * | 8/2002 | Knyphausen et al. | 704/2 |
| 2002/0138331 | A1 | 9/2002 | Hosea et al. | |
| 2003/0023662 | A1 | 1/2003 | Yaung | |
| 2003/0023677 | A1 | 1/2003 | Morison Zuill et al. | |
| 2003/0046401 | A1 | 3/2003 | Abbott et al. | |
| 2003/0078830 | A1 | 4/2003 | Wagner et al. | |
| 2003/0126003 | A1 * | 7/2003 | vom Scheidt et al. | 705/8 |
| 2003/0130994 | A1 | 7/2003 | Singh et al. | |
| 2003/0135481 | A1 * | 7/2003 | Helmes et al. | 707/1 |
| 2003/0135559 | A1 | 7/2003 | Bellotti et al. | |
| 2003/0144868 | A1 | 7/2003 | MacIntyre et al. | |
| 2003/0154180 | A1 | 8/2003 | Case et al. | |
| 2004/0088315 | A1 | 5/2004 | Elder et al. | |
| 2004/0098467 | A1 | 5/2004 | Dewey et al. | |
| 2004/0119738 | A1 | 6/2004 | Beringer et al. | |
| 2004/0119752 | A1 | 6/2004 | Beringer et al. | |
| 2004/0122693 | A1 | 6/2004 | Hatscher et al. | |
| 2004/0122696 | A1 | 6/2004 | Beringer | |
| 2004/0122853 | A1 | 6/2004 | Moore | |
| 2004/0128156 | A1 | 7/2004 | Beringer et al. | |
| 2004/0131050 | A1 | 7/2004 | Beringer et al. | |
| 2004/0133413 | A1 | 7/2004 | Beringer et al. | |
| 2005/0086204 | A1 | 4/2005 | Coiera et al. | |

OTHER PUBLICATIONS

ProjectDash Drives Consistency in Communicating Project Status Online using Innovative Graphical Project Dashboard. Business Editors. Business Wire. New York: Mar. 4, 2002.*
www.idashes.net screenshots. Jun. 2001. accessed from www.archive.org.*
U.S. Appl. No. 10/628,824, filed Jul. 28, 2003, entitled "Personal Procedure Agent".
U.S. Appl. No. 10/655,783, filed Sep. 5, 2003, entitled "Community Builder".
U.S. Appl. No. 10/658,584, filed Sep. 8, 2003, entitled "Resource Finder Tool".
U.S. Appl. No. 10/663,343, filed Sep. 15, 2003, entitled "Collaborative Information Spaces".
U.S. Appl. No. 10/663,365, filed Sep. 15, 2003, entitled "Resource Templates".
U.S. Appl. No. 10/663,372, filed Sep. 15, 2003, entitled "Compiling User Profile Information From Multiple Sources".
U.S. Appl. No. 10/663,382, filed Sep. 15, 2003, entitled "Control Center Pages".
"OnlineHobbyist.com," Austin American Statesman, Austin, Texas, Sep. 11, 2000, p. E.1.
"SAP Customers Worldwide Exploit New Business Opportunities With Web-Based Real-Time Business Solutions," (Business Wire. New York, Dec. 8, 1998, p. 1).
Edward Weinberger et al., "Computers in Radiology: MyPACS.net: A Web-Based Teaching File Authoring Tool," The American Journal of Roentgenology, Sep. 2002, Issue 179, pp. 579-582.
Joao Cavalcanti et al., "A Logic-Based Approach for Automatic Synthesis and Maintenance of Web Sites," SEKE 2002, ACM, Jul. 15-19, 2002.
PCT International Search Report, mailed Mar. 10, 2005 (3 pages).
Petra Schubert et al., "Virtual Communities of Transaction: The Role of Personalization in Electronic Commerce," Global Networked Organizations, Twelfth International Bled Electronic Commerce Conference, Jun. 1999, Bled, Slovenia, pp. 1-12.
Robert Neches et al., "Collaborative Information Space Analysis Tools," D-Lib Magazine, Oct. 1998.
Yahoo! (pages documented from the Internet Archive from Dec. 17, 2001: http://web.archive.org/web/20011217201239/http://group.yahoo.com/; http://web.archive.org/web/2001121700856/help.yahoo.com/help/groups/ http://web.archive.org/web/20011202071303/help.yahoo.com/help/us/groups/groups-01.ht...; http://web.archive.org/web/20011202072641/help.yahoo.com/help/us/groups/groups-23.ht...; http://web.archive.org/web/200111127132338/dir.groups.yahoo.com/dir/Hobbies__Crafts/ http://web.archive.org/web/20011125123443/dir.groups.yahoo.com/dir/Hobbies__Crafts/; http://web.archive.org/web/200111125183404/groups.yahoo.com/group/pencil-sharpeners; http://web.archive.org/web/200111217203233/http://people.yahoo.com/).
"Project Metrics Suggested Categories and Measurements for Organizations Managing Projects," http://amp.stanford.edu/CDMaterials/EPMO/data/Articles/ProjectDash.htm, Copyright 2001-2, printed Jul. 28, 2010, iDashes Inc. (1 page).

* cited by examiner

GUIDED PROCEDURE FRAMEWORK

CROSS REFERENCE TO RELATED APPLICATIONS

This application claims the benefit of priority from U.S. Provisional Application entitled "User Productivity Suite", filed Dec. 23, 2002, Application Serial No. 60/436,219.

BACKGROUND

The following description relates to tools that enable a user to link relevant resources to a sequence of steps of a procedure.

Knowledge sharing is considered a relatively important tool for a user to achieve a high level productivity. Many users of conventional business systems may find it difficult to access information and/or tools required to perform a task. For example, the most relevant knowledge required by a user may be stored in documents, or in the head of another user or employee. Moreover, even if a user finds the information it is typically difficult to start an effective collaboration to perform a task or project. For example, administrative assistants may need to coordinate several activities to prepare for a customer visit, or a manager may need to access multiple information sources to complete a compensation plan for one or more user, etc. These types of activities may involve a relatively large number of tasks to complete, sometimes in a specific sequence and/or combination. Regardless of whether the tasks need to be completed regularly (e.g., daily, weekly) or just occasionally, a user of a database system may need to access several executable tools (e.g., executable applications) and retrieve information from various sources (e.g., data stored on a computer, or computer network). In a conventional work system, many tools and/or processes may have only one owner. Therefore, when multiple participants require that tool and/or process to complete a task, it is important that participants of a team are able to collaborate. Moreover, the tracking of completion of activities related to a collaborative project is important to ensure that all tasks related to the project are processed and completed in a timely fashion.

Recent developments in enterprise management systems have attempted to integrate multiple legacy systems, typically found in existing heterogeneous information technology (IT) environments, into a common enterprise management solution. Such integration technologies frequently fail to deliver a fully integrated platform that also provides sufficient flexibility to adjust to rapidly changing enterprise environments.

SUMMARY

The present application describes systems and techniques relating to associating a procedure with actions and resources.

In one aspect, the technique is facilitated by specifying a list of one or more actions corresponding to a specified procedure and, for each action, one or more resources associated with the action; indicating an action order, including indicating whether two or more actions in the action list are to be performed in an order-dependent manner or in an order-independent manner; formatting the list of actions into a presentation format; and enabling a user to access the resources associated with the specified procedure.

In an implementation, the specified actions are identified by a process pattern associated with the specified procedure.

The technique may include identifying one or more common action patterns; abstracting each reusable common action pattern; and providing a template including the abstracted patterns for the specified procedure based on business context. The techniques also may include enabling the user to modify the template with ad-hoc collaboration actions based on work practice for a particular business scenario.

The technique can include associating deliverables, contributors and resources with an action. A display can be provided for tracking the status of deliverables, contributors, resources or the completion of the procedure. The display may be a dashboard to display or link to the tracking displays.

Other aspects include an article comprising a machine-readable medium storing machine-readable instructions that, when executed, cause a machine to perform the disclosed techniques, and/or a system that includes one or more computers configured to implement the disclosed techniques.

Some implementations of the systems and techniques described herein may provide one or more of the following advantages. The tool can provide standardized processes, enforce corporate guidelines and policies and roll-out of best practices through the use of business process templates. The tool can enable interaction between co-workers through collaborative features. Provision for ad-hoc changes can ensure procedural flexibility for unexpected occurrences and out-of-the ordinary processes.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to implementation and execution of cross-functional processes and may include support for team and content driven processes.

The Guided procedure framework is an ad-hoc workflow application framework for supporting collaborative work procedures. The tool may use a process pattern approach for an entire work procedure and/or archetypical steps or actions within the larger workflow.

The tool may include action patterns common to one or more procedures or workflows and specify the abstract, reusable lightweight process patterns as templates. These templates can be hybrid in the sense that they may combine business context and flow as well as ad-hoc people-to-people coordination reflecting actual work practice around a business scenario.

The Guided Procedure Framework may be used to order tasks, applications, tools, documents, resources and deliverables according to the process life cycle, thus enabling participants to track deliverables and be aware of the whole process state. The tool can provide process control and collaboration functionalities, such as a process design-time for end users that can be used at run-time, a process view (run-time) providing the process participants with a view on the whole procedure according to each user's authorizations, and a process context support for semantics where resources and deliverables can be defined for a whole procedure, single procedure step or block of procedure steps. A deliverable view may enable users to monitor the process according to the expected results. Pre-defined templates and workflow patterns may be available through the Guided Procedure Framework and can be used to define as well as adapt procedure templates (design-time) and even single instances (run-time). The Guided Procedure Framework can distinguish between the owner of the template and the owner of the instance of the Guided Procedure. The owners are not necessarily the same person and each may be have different rights to modify the template and instance.

Figure 3:
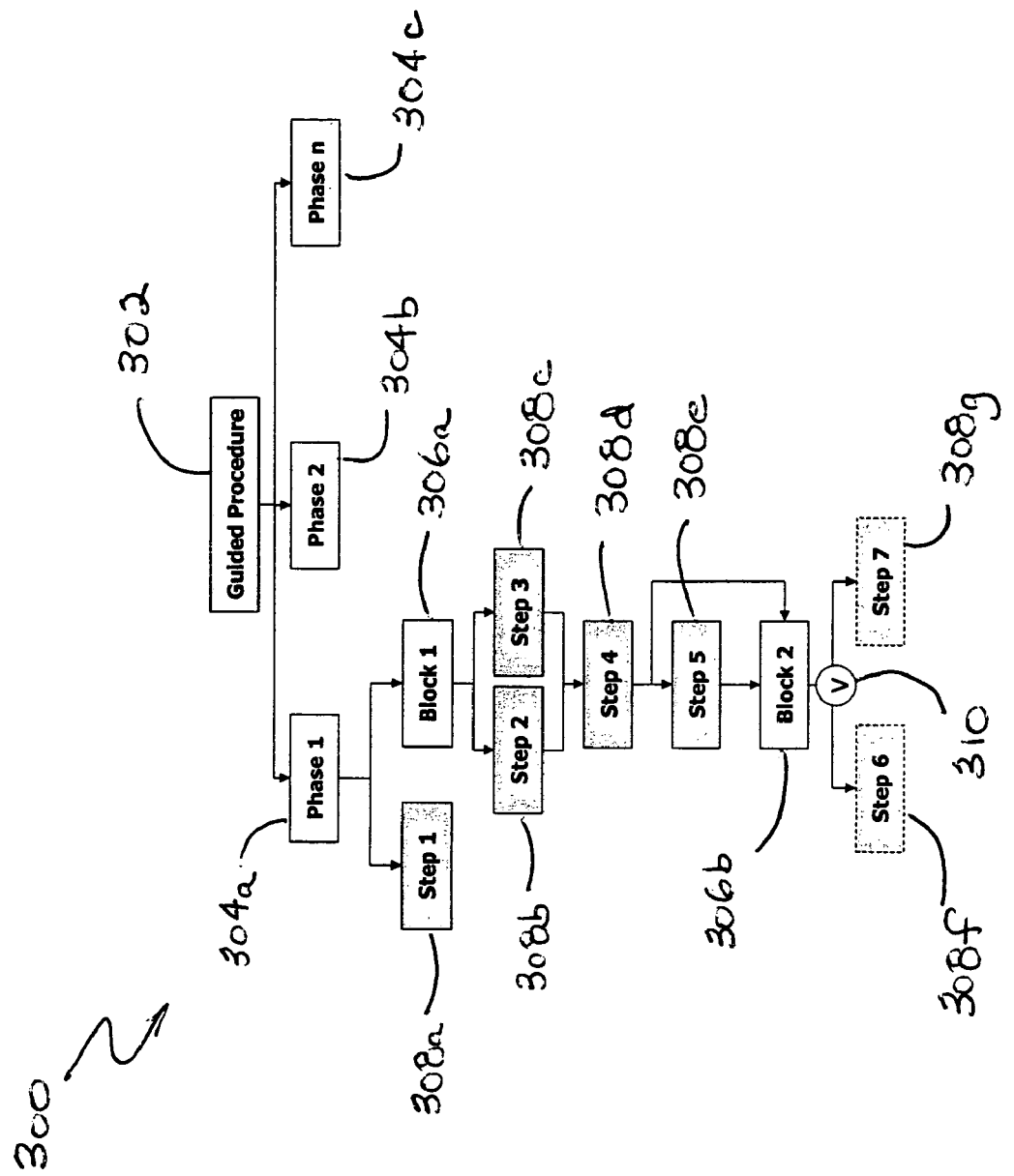
FIG. 3 is a flow diagram of illustrative guided procedure phases, blocks and steps.

FIG. 3 is a flow diagram 300 of an implementation of a guided procedure tool. A guided procedure is developed by a procedure owner. The owner is the person who actually initiates (an instance of) a guided procedure. The owner is authorized to make ad-hoc changes to the owned guided procedures at run-time, monitor the use if the guided procedure, grant subscription permissions to other users or user groups to this running procedure, determine the contributors to phases, blocks or steps and delegate a procedure, phase, block or step to a contributor. A contributor is a participant involved in processing a guided procedure. A contributor to a guided procedure can, depending on authorizations, process several phases or steps or the entire procedure; delegate their assigned procedure, phase, block or steps to another contributor; create or change documents; monitor the assigned procedure, phase, block or steps, and; grant other contributors access rights to an assigned procedure, phase, block or steps. A guided procedure 302 enables the owner to associate procedures with resources to help accomplish the procedure. Providing the user with access to resources associated with the specified procedure involves enabling the user to perform certain operations, including specifying a list of one or more actions that correspond to the specified procedure, specifying resources associated with the actions and indicating an order for the tasks, if appropriate. As described in further detail below, may be defined through a process, a process context and a team formed by all the process-related people. Actions are a link between the process and the context. An action may be a reusable process pattern that contains semantic information as well as input (resources) and output (deliverables) that may be needed and/or created during the execution of a corresponding procedure step.

Figure 10:
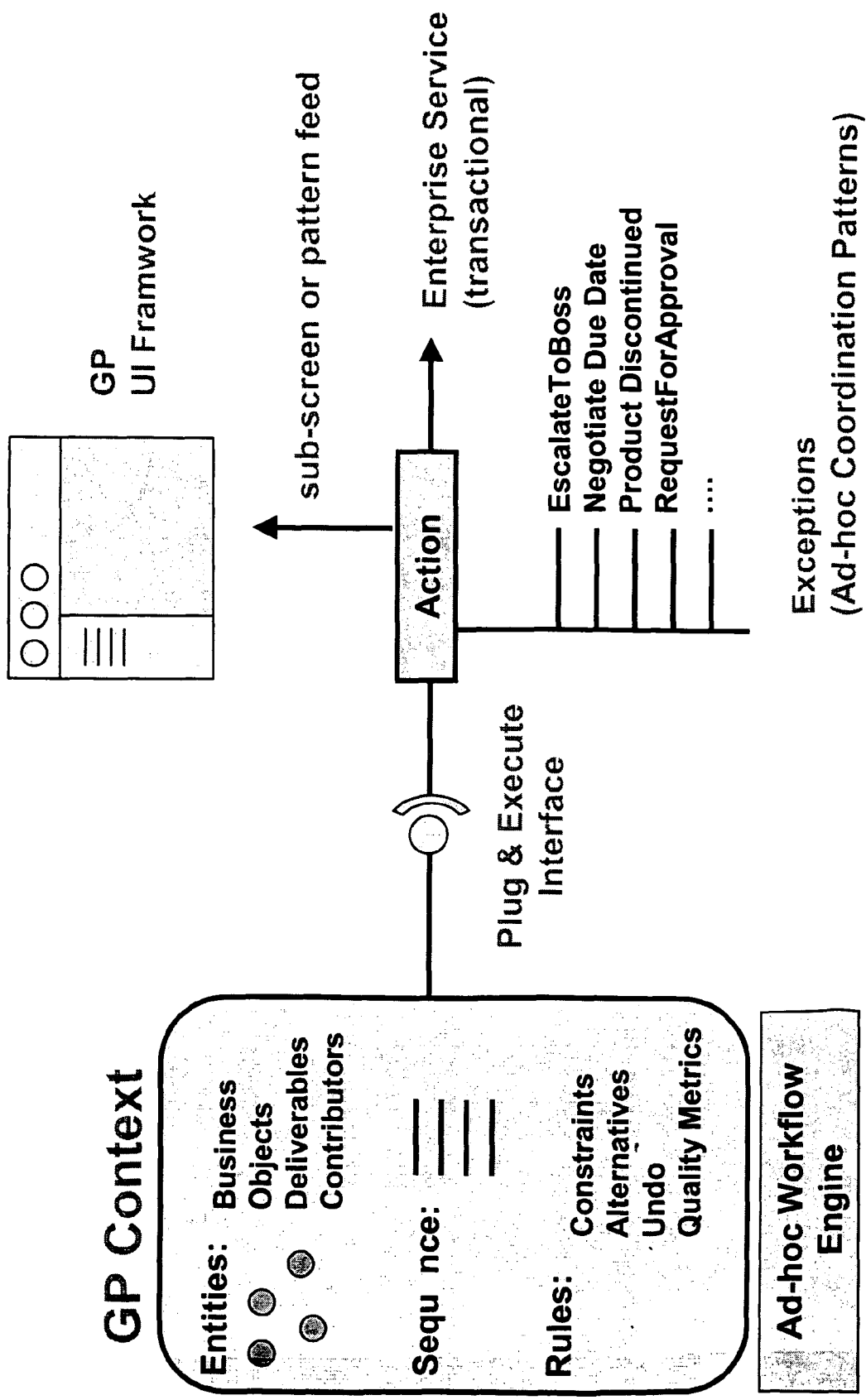
FIG. 10 is a service model for actions.

Referring to FIG. 10, actions may be viewed as micro-process patterns modeled as a hybrid enterprise service and coming with a plug&execute interface that enables the communication between an action (service) and a context. An Action has a business logic. For example, the action may call an application or a service. The action may have exceptions if it doesn't work as planned (e.g. someone refuses to work on a step he got delegated) and also may have a user interface (UI). Actions constructed in this manner may not necessarily be tied to a particular procedure. The action may be modular. That is, the actions may be a reusable action pattern abstracted from the business context that may be plugged into a procedure having a similar business context and where the action can feed the context or receive data from the context. Exceptions and dependencies within actions may be handled by introducing rules and pre-configuring common ad-hoc coordination patterns to resolve problems related to exceptions. In an implementation, the Guided Procedure may launch web services but provide additional semantics and functionality necessary to make a process pattern plug&execute. The Guided Procedure actions model resources, actors, exceptions, inputs, outputs, and can manage stateful micro workflows (e.g. people-to-people coordinations) that handle exceptions.

The context may be built by all input and output parameters of the actions that are part of the procedure. This enables calling of an action (which is calling an application or a service) parameterized, and use the output of the action to feed the context. As an example, a step in inducting a new hire may be to assign a workspace to the new employee. The output of this step may be the workspace, which is the employee's room number and the seat. The next step can be "order equipment for the new employee," the step being delegated to the purchasing department. Using the context of the procedure, the "order equipment" step may be called parametized with the context previously determined. In the example, the parameters are the user (new employee the equipment is for) and the workspace (room number and seat). Thus, the purchasing department knows who is to receive the equipment and where the equipment is to be delivered.

Referring again to FIG. 3, the guided procedure framework is a tool that may be described in terms of phases, blocks and steps and how the process steps depend on each other. Phases 304 may be used to define a sub-structure of the guided procedure 302. A phase 304 can include one or more blocks 306 and/or steps 308. A block 306a can contain steps that may be executed in parallel or in sequence. Sequential steps, such as 308d, 308e, are to be executed one after the other. Parallel steps, such as 308b, 308c, may be executed in the same time rather than sequentially. For example, a person may work on step 308b or step 308c depending on their preferences or separate people may perform the steps. The parallel steps 308b, 308c in the illustrated example must both be completed before the procedure continues to the next step 308d. A block 306b can provide a way to define alternative 310 steps 308f, 308g that can lead to a dynamic choice that may be made at run-time. The tool may be arranged to assist the user through context awareness by either recommendation or automatic selection of the alternative steps that may be executed to complete the requirements of block 306b. For example, in a recommendation, the tool may propose one step if a manager is processing the guided procedure while an employee may be presented with a different step to process. The tool may hide the existence of the alternative step from one or more of the users. In an example of an automatic selection, the tool may determine which step is to be performed next after a user completes a step selected at run-time.

A Phase can contain of a group of steps. Phases are sequential so that a first phase should be completed before implementing a next phase. The transition from the first phase to the next may depend on the status of steps within the first phase. For example, when all steps of a phase are completed, the procedure allows user to proceed with the next phase. When not all steps are completed, the transition can depend on the type of step not completed. If the uncompleted step is optional then the possible phase transitions are to (1) do the uncompleted step now, (2) do the uncompleted step later, (3) do the uncompleted step in the next phase, (4) do not do the uncompleted step, or (5) replace the uncompleted step with a different step. If the uncompleted step is mandatory but the output is not needed later then the possible phase transitions are to (1) do the uncompleted step now, (2) do the uncompleted step later, (3) do the uncompleted step in the next phase, or (4) replace the uncompleted step with a different step. If the uncompleted step is mandatory and the output is needed later then the possible phase transitions are to (1) do the uncompleted step now, (2) do the uncompleted step before the step where the output is need in the next phase, or (3) replace the uncompleted step with a different step that produces the same output.

A phase transition may represent a human decision point if it is a stage or gate within a formal process. This may be direct support of the workflow by a higher level semantic. The transition from phase to phase may imply a decision making process including, for example, decision meetings, formal documents submitted to a steering committee and presentation to a board. If the phase represents a decision point, a phase template may be created that mirrors best practices around (collaborative) decision-making.

Steps are the lowest structure in a guided procedure. A processor may be defined for each step at design-time. The processor is responsible for the completion of the step and, by default, may be the procedure owner. The steps can be either mandatory or optional, rule-based or protected. A mandatory or optional step requires no further explanation. A rule-based step is one where required processing of the step depends on a circumstance. In the case of alternative steps such as 308f, 308g, the user can be provided with a step selection at runtime. The selection of the appropriate step can occur either manually or automatically with the help of a rule assistant for ad-hoc decisions. A rule based decision support can assist the user by recommending steps according to values of context variables. For example, a rule may be that that two of three steps must be provided at which time the procedure continues automatically. Thus, the processing of each of the three steps depends upon a rule. An example of a rule-based decision for two steps such as 308f, 308g, respectively, may be "if amount is less then $1000 then request approval of Manager" and if amount is greater or equal to $1000 then request approval of Vice-President." A protected step is one that may not be changed in design-time. A protected step may be one that reflects a policy set by a central department that is deploying the procedure. For example, an accounting department policy may require that only an accounting department manager may authorize expenditures over $1000. A process step requiring approval of an accounting department manager may be protected so that the step may not be changed to any manager's approval.

An action may be assigned for each step. Information concerning a running procedure that a processor can see depends on rights granted to the processor. That is, certain steps may be hidden from a processor or other user.

An action is that which is to be done in a procedure step. The action models a process step by linking the process to the process context. The action can be reused within other, different, guided procedures. The action may defined by (1) application/service launch information, (2) a context-aware list of needed resources and input parameters, (3) a context-aware list of deliverables (output), (3) a list of contributors, and (4) and primary objects. Logical actions can bind enterprise services dynamically during run-time using Universal Description, Discovery, and Integration (UDDI) type mapping mechanisms. An action may launch an enterprise service directly or dissolve the actual service through a request to a UDDI-type server.

Application/Service Launch Information: Launch Information may be a URL to the embedded application or service that has to be started for executing an action. The URL can be parameterized and is calculated at run-time with the help of a system landscape service, where the systems, applications and services are registered, and of the guided procedures context service for filling the parameters. The service selection may have step-states that include: step not yet active, step active but not yet executed, step already executed but still repeatable (no steps dependent on the outcome of this step have yet been executed), step already executed but not repeatable (other dependent steps have already been executed. e.g., an approval on this step has been executed).

Resources and Input Parameters: Resources and Input Parameters are any business object (e.g., cost center, customer, sales order) or parameter needed for the execution of the action. These parameters or objects may be accessed by the embedded application through parameter passing in the URL or through the guided procedures context service (data sharing and eventing). Objects include object-like data structures such as, for example, XML schema. An interface between the guided procedure context and action can support the exchange of business objects that are related to an action. The data structure of the object may allow access to object-like data, which may be referred to as structured parameters. The resources and parameters may be set at procedure design-time, procedure instantiation time or dynamically at run-time.

A procedure can instantiate sub-procedures. In this case, the procedure can have control over the sub-procedures to, for example, start, stop, freeze and wait for the instantiated sub-processes. For example, a procedure may instantiate a sub-procedure to hire a new employee and start the sub-procedure. The procedure may need to stop the sub-procedure if the new hire does not sign a required employment document. In another example, the procedure may freeze the sub-procedure so that none of the procedures can be executed. This may be required when, for example, to await an unrelated decision such as where to build a new facility. The sub-procedure may be re-started after the freeze. A procedure tree view may be used to show the hierarchy, dependencies or status of procedures and sub-procedures. Cooperative process control between sub-processes of guided procedures may be used to maintain automatically instances of business processes.

Guided procedures can integrate a Resource Finder Tool for searching and getting resources to fill the resource parameters. A Resource Finder Tool may be a service implementing an application program interface (API) and that can be integrated within guided procedures for searching and getting access to resources including instances or collections of instances, collaborators, experts and documents for example. The Resource Finder Tool may use a resource template to receive parameters from sources including the users profile, where typical data is held (e.g., my boss, my team assistant, the rooms I am responsible for, my favorite hotel). All resources defined for the action are available in the procedure context. The resource values can be automatically set by the system at run-time or referenced later in the process. If some resource values are not known at run-time when the action has to be executed, a selection screen with context information (resources with missing values) can be shown before any service/application is called.

Resource Templates: An action resource can be specified through a resource template. The Resource Finder Tool can take this template into account to restrict the search according to the constraints described in the template (selection criteria). Resource templates describe specific resources (single or collection) needed in actions, e.g. <pick meeting room>, <book table for lunch>, <schedule conference call>, <find keynote speaker>. Preferred resources can be stored as frequently used or personalized resources, for example, my project team, our meeting room, my trusted architects. Resources also may be predefined in the user context, for example, my boss, my office admin, my approver and my group. A Resource Template can be defined in the following way: the Resource Class determines the type of resource (for example, people, room, sales order, customer, hotel); the Resource Attributes define constraints when searching for resources.

Deliverables and Output Parameters: Deliverables and output parameters are the result of an action and can include structured data (e.g., an XML schema). They are available in the Procedure Context and can be tracked during their life cycle. That is, a user may monitor the deliverables in a guided procedure and be notified by any event such as a deliverable change, availability or approval of a step. The process of getting the deliverable also may be monitored. For example, a user may monitor messaging leading to the deliverable and interactions between contributors. A lock may be enabled to prevent changes to some deliverables such as a document sent to the manager for approval wherein in may be necessary to lock the document to prevent changes while waiting for the approval. A document that has been approved also may be locked. A locked document may be unlocked by certain users to enable, for example, corrections.

Contributor List: The contributor list is a list of people that participate in the completion of a procedure step. The list may be available in the procedure context and used by the action to correspondingly assign tasks. A contributor can be assigned in the design-time (a certain person is known to be responsible for completion of the step) or dynamically determined while the procedure is running.

Figure 4:
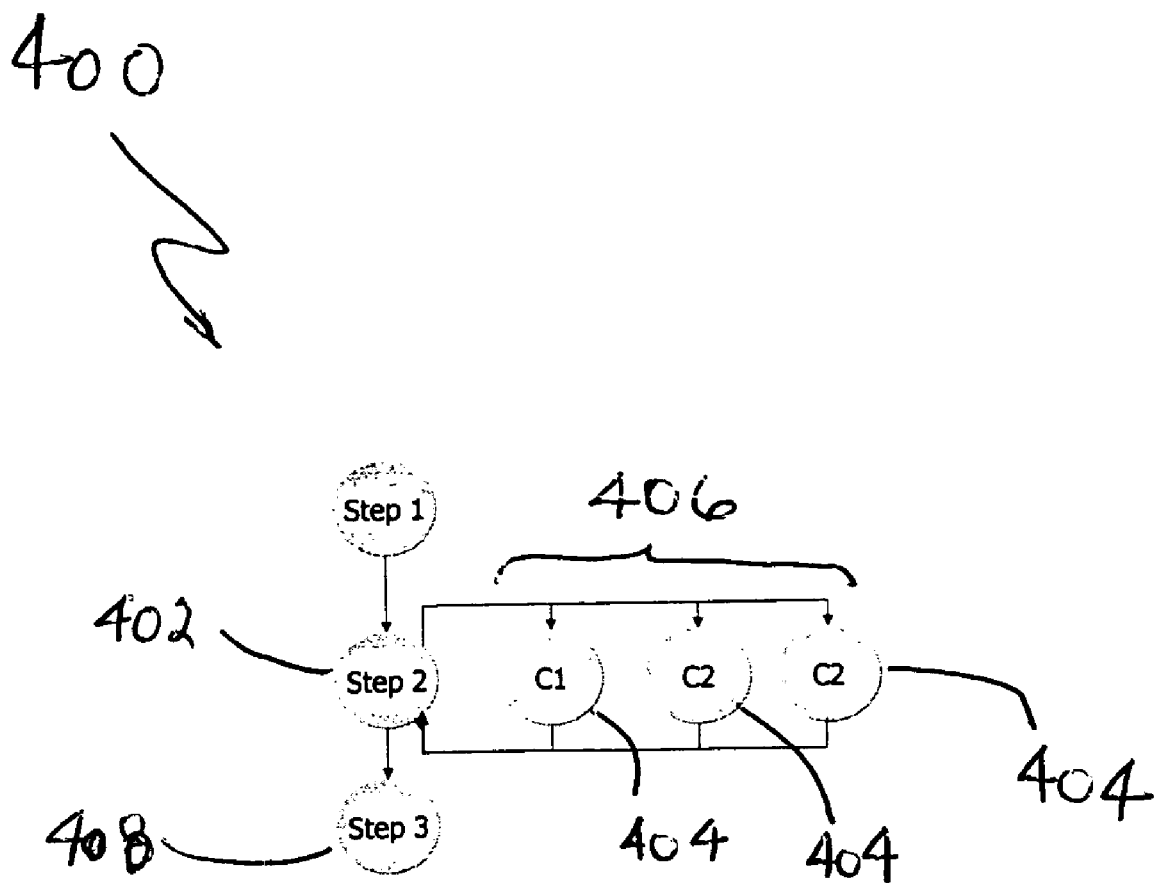
FIG. 4 is a portion of a flow diagram illustrating an information gathering step.

A contributor may contribute to a procedure, phase, block or step. A step may have subtasks done by more than one contributor in parallel. The subtasks may be mandatory or optional. A user may stop the optional subtasks and proceed in with the procedure. FIG. 4 illustrates a portion of a flow diagram 400 having an information-gathering step 402 such as "gather information for the next staff outing." In a subtask 406, the user may send a request for input from his colleagues 404. After receiving enough input from the colleagues, the user may decide to stop the subtasks 406 and carry on with the next process step 408.

Primary Objects: Primary objects are objects or parameters with known semantics of primary importance that can be used by guided procedures to display some significant information. A procedure can have a primary object. For example, a new hire procedure may have the hired employee as primary object. In this example, those contributors or persons involved in the procedure know to whom to deliver deliverables such as a personal computer or telephone, or that needs clearances and permissions. A phase, block and step may have a primary object. A primary object also may be passed as a default input parameter to an action or as part of a condition to a rule-based step, block or phase.

Figure 5:
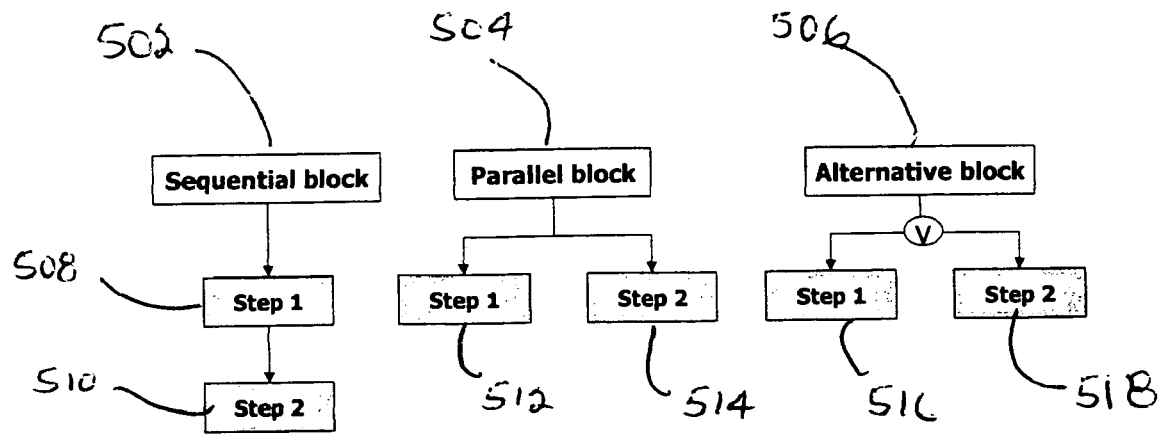
FIG. 5 illustrates portions of flow diagrams illustrating some types of guided procedure blocks.
Figure 5:
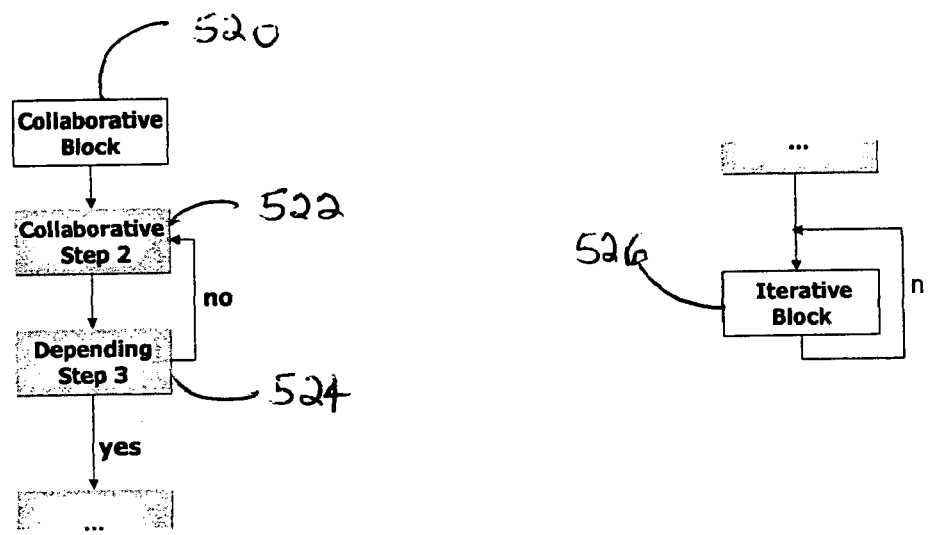
Figure 5:
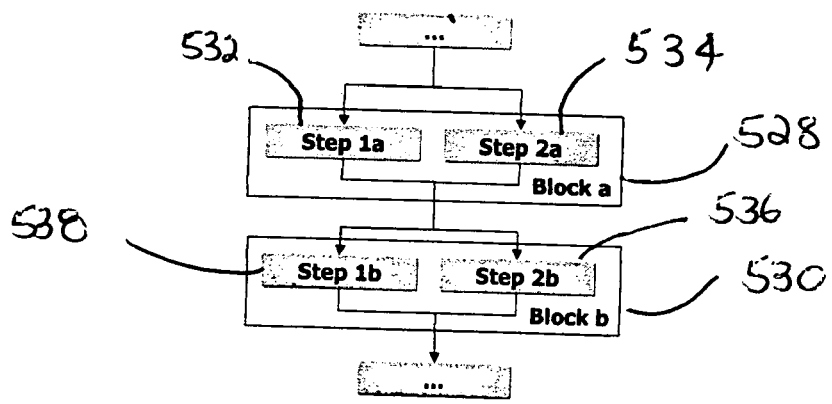

FIG. 5 illustrates examples of types of blocks. The types of blocks may be combined to form a block having one or types of sub-blocks. A sequential block 502 in has steps that are performed in sequence, for example, steps 510, 512; a parallel block 504 has steps that may be performed in parallel, for example, steps 514, 516, and; an alternative block 506 has steps that may be performed in the alternative as described above such as step 518, 520. A collaborative block 520 includes steps such as 522, 524 characterized by (1) having more than one person involved in executing the steps, (2) the steps may be executed by two different people, (3) the output of the first step may be the input for the second step, and (4) a second step can be a decision such as whether to proceed or ask for repeating a first step. An iterative block 526 includes steps that may be executed more than once. An entire block or one or more steps with the block may be repeated a predetermined number of times an iterative parallel block that is iterated two times is illustrated by blocks 528, 530. Blocks 528, 530 include step pairs 532, 534 and 536, 538, respectively. As an example, suppose the task of setting up a conference includes the two parallel blocks of booking a room and arranging for a speech for more than one meeting. The blocks are parallel because the booking a room may be done in parallel with the arranging for the speeches. That is, the blocks are independent of one another. Data coming from an earlier step (for example, selecting speakers, determining topics for speeches and expected number of listeners) can be used in the parallel recurring (iterative) blocks as input for the next iterative block.

Branching is another form of an alternative step. A decision may be made at run-time. The workflow dynamically changes, depending on the user's decision. Alternative actions may offer alternative actions for one step. For example, selecting a conference call or an alternative WebEx conference. This doesn't affect the remainder part of the guided procedure. A branch may redirect the procedure to another path or update a whole section of the guided procedure template.

Figure 6:
FIG. 6 is a portion of a flow diagram using a collaborative block.
Figure 6:
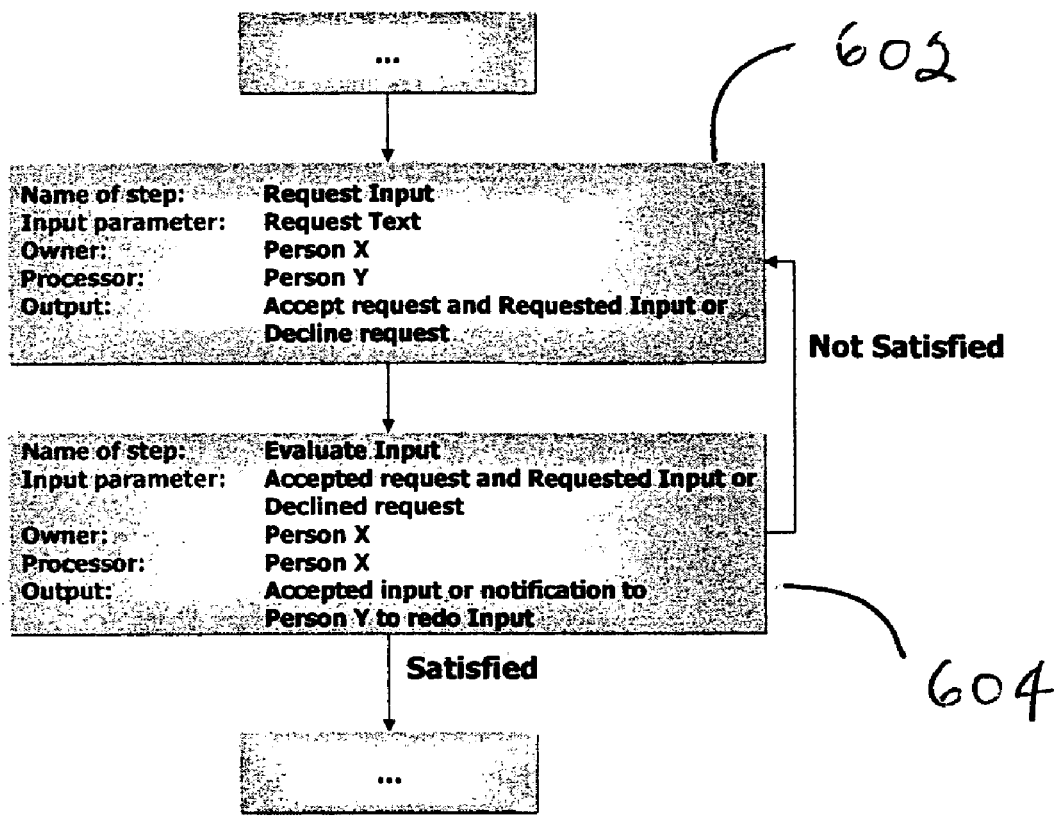

Process Templates are pre-defined micro-workflows that use the block patterns described above and may pre-fill the blocks with steps. When based on the collaborative patterns, the template may provide the basis for allowing individuals to deal directly with the consequences of their work for completion and satisfaction. Process templates are available in the design-time, but they can be adjusted or completed at design-time as well as at run-time. FIG. 6 illustrates an implementation of a "Request for Input" procedure 600 that uses the collaborative block pattern showing the context of a step. The output of the step "Request Input" 602 serves as the input for the step "Evaluate Input" 604. Person X owns the procedure 600. Person Y is the processor of a step 602 that requests a text input from person Y. The result of step 602 is provided as input to step 604. Person X is the processor of the step 604 that evaluates the input text of step 602. The output of step 604 is a acceptance of the input or a notification to Person Y to re-process step 602. Upon acceptance of the input, the process continues to the next step (not shown).

A guided procedure, a phase, a block or any single step may be delegated to another contributor. In an implementation, a delegator may ask a contributor to complete an action that has been partially completed. The delegator may still see the procedure in their Ongoing Procedures Dashboard, described below, to monitor the progress of the delegated portion. The contributor receives the delegated portion in their Inbox. In an implementation, the contributor sees only the delegated portion and steps included in the delegated portion. The delegator may provide additional visibility into the procedure to the contributor. Ownership of a procedure may be unchanged by any delegations. The contributor may accept or decline the delegation. Upon acceptance, the contributor also may require needed authorizations access to resources and applications. Associated with the delegation may be a pre-defined action that includes a pre-filled in request for the required authorizations and access rights. In an implementation, the delegator may include permissions for the contributor to delegate some or the entire delegated portion to a third contributor. In certain contexts a contributor may represent a group of users. For example, a step that may be delegated to the Human Resources department and processed by anyone in that department.

Due dates and/or an expected duration may be associated with a procedure, phase, block or step. Based upon the due dates and duration, the owner and involved contributors may receive reminders concerning incomplete steps. Initially, the owner of the procedure may define an estimated time to complete a task. In one implementation, the system may refine the estimates by averaging the time to complete similar tasks. The owner may override the system estimates. In an implementation, the contributor or supplying party may negotiate or update the expected time to complete or due date.

The guided procedure framework can include (1) a design-time, to create templates, (2) an instantiation page, to set up an instance of a guided procedure, and (3) a run-time, to start and run the guided procedure. The run-time can include an ongoing procedure dashboard to monitor the progress of the guided procedure, a procedure inbox where delegations and requests are received, the framework for running an instantiated guided procedure and the information on the running of the guided procedure itself. A guided procedure may be triggered by an event such as an email, action item, meeting minutes, assigned task or an event (e.g., hiring a new employee). Functionality may be included that allows a user to determine what triggered the procedure or why and how was it was instantiated. This may include a back tracking functionality to previous work, or also may link to the original action item that triggered the procedure. The Guided Procedure Framework also may be linked to automatically invalidate procedures if the trigger does not exist any more (e.g., the new hire decides not to affiliate with the company).

In an implementation, the guided procedures design-time is a web-based tool for configuring guided procedures by editing predefined templates delivered with the guided procedures tool or by creating new templates. The templates define the process and the context of the corresponding guided procedure together with the dependencies to guided procedures actions. New actions also can be created. Process descriptions may also be imported in formats such as Process Interchange Format (PIC) files or VISIO.

Procedures can be assigned to people, roles, business objects, work items or worksets that may select and initialize an instance of the guided procedure framework.

At design-time procedure templates as well as all other objects belonging to the template may be created, copied, edited and deleted. In an implementation, it is possible to assign a name and a short description to each object and procedure and to define which events trigger a procedure based on an event model or a rule engine.

Procedures may be embedded within a master procedure. A imported procedure can appear as a nested level within a master procedure. A procedure either can be imported into the master procedure or there may be a link to it in the master procedure. In the case of importing a procedure, the guided procedure framework may be arranged so that once a procedure is imported, changes in the original procedure do not affect the imported procedure. A linked procedure can be integrated as a single action, which is a link to the referred procedure. The status of the linked procedure may be displayed in the content area of the master procedure before launching to the linked procedure. In the case of a link to a procedure, the guided procedure framework may be arranged so that changes in the procedure are reflected in the imported procedure. The creator of the master procedure may be notified that changes have been made in the linked procedure that may affect the master. The creator of the master procedure may then decide whether he wants to keep the old version of the embedded procedure, or adapt his own to the changed procedure.

When the definition of a procedure is finished, the procedure template together with the context definition may be saved. Saved procedure templates may be imported and exported into other systems from the client side, for example, from a development system into a consolidation system and then into a productive system.

Each procedure has a start page, which may be referred to as an initialization page. The initialization page may be user-directed or aided by a wizard. The initialization page may enable users to define which optional steps will not be available during run-time, to set the procedures context parameters or to change template values (for example, <my team> to <HR development learn> or <my secretary> to <facility team>). The user can define the resources and deliverables, either global (for the procedure) or local (for the steps). A wizard also may be provided to change the template. The template wizard may include, for example, a check list for required entries, a simple procedure without dependencies or an advanced procedure. The selections may lead to specialized wizards at design time.

Because the ad-hoc procedure adaptation has been done, it may be possible to start the procedure from the instantiation page or start it later from the Ongoing Procedures Dashboard, described below.

An API for the start of parameterized guided procedures may also be available. The procedure input parameters may be the global procedure parameters, resources and deliverables defined in the procedure context.

The owner or an overseer of the guided procedure can monitor the aspects of guided procedure. Monitoring the activity on a procedure may be presented as a view of the entire procedure or a selected phase. The persons responsible for different phases or steps can see the phases or steps for which they are responsible. A view of the entire procedure may provide a central user interface to execute the different steps and to monitor the status of the steps and contributors.

Figure 7:
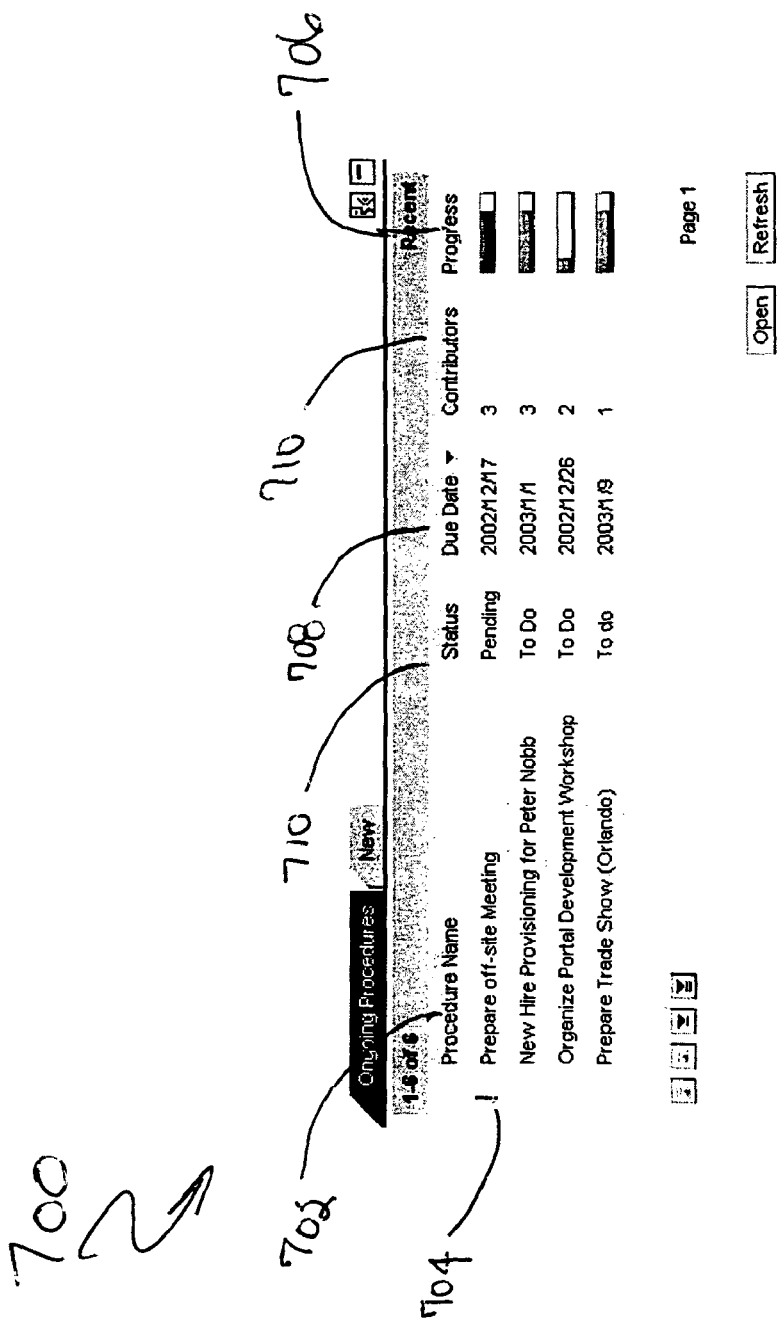
FIG. 7 is an implementation of a user's ongoing procedures dashboard.

FIG. 7 is an illustration of an implementation of a user's Ongoing Procedures Dashboard 700. Guided procedures may have the capability or interface to expose integrated status information to other applications such as the Control Center, which is a listing of ongoing procedures in a dashboard. The status information may include key performance indicators (KPI) and status information specific to the procedures including number of contributors, progress indicator, status pending/your action/in-work, due date, owner, and so on. An Ongoing Procedures Dashboard may display all guided procedures 702 started or monitored by a user. Procedures that are pending may be marked with a pending-flag 704 to alert the user to procedures that may require attention. An inbox (not shown), described below as "My Procedures Inbox," may be provided to show the list of all steps that the user has to execute but that are not part of guided procedures started by the user himself and all steps that have to be executed by him but where he has to wait for some Input from other users, such as for approval or contribution. The Dashboard also may show the progress completion rate 706, the overall duration time of the running procedure (not shown), the due date 708, the number of contributors 710 and the status 712 of the procedure. The status 712 may include categories such as "ongoing" for a delegated block or step; "pending" if a contributor has not completed a task on time and the next step depends on the contribution, and; "Todo" when the owner of a procedure has to work on the next step. Other status categories may be used. In response to selecting by clicking, for example, on a procedure, the dashboard may show the current phase/block/step the processor has to work on. A user having the appropriate permissions may navigate back and forth as desired.

A user's "MyProcedures Inbox" may display the steps, blocks, phases or guided procedures assigned to the user. The inbox may display information related to the assigned items including the name of the procedure, the name of the delegator, the owner of the procedure, a description of what action needs to be done and the due date. The user can decide whether to accept to contribute or to decline the delegation. The delegator is sent a notification when a user declines. The delegator may attempt to delegate the item to another user or to do the required work himself. In an implementation, a user may establish rules for received procedures such as "always decline" or "decline on holidays." Upon acceptance, the user may start the work from the inbox. Depending on the permissions granted to the user, the user may be able to monitor the progress of at least some of the running procedure. For example, the user may be granted permission to see only the work the user is required to do, the deliverables or the entire procedure.

Actions are a combination of applications/services, resources, contributors and deliverables. Actions may be associated with pre-designed pages or tools and may have an integrated mechanism for status and artifact tracking. Actions define what kind of service will be called, for example, a portal iView, a Web Dynpro application or a Web-service. In the case of a web-service, the step can be executed automatically and has no user-interface attached. Some or all information defined in the action can be displayed combined with the application's user-interface.

Figure 8:
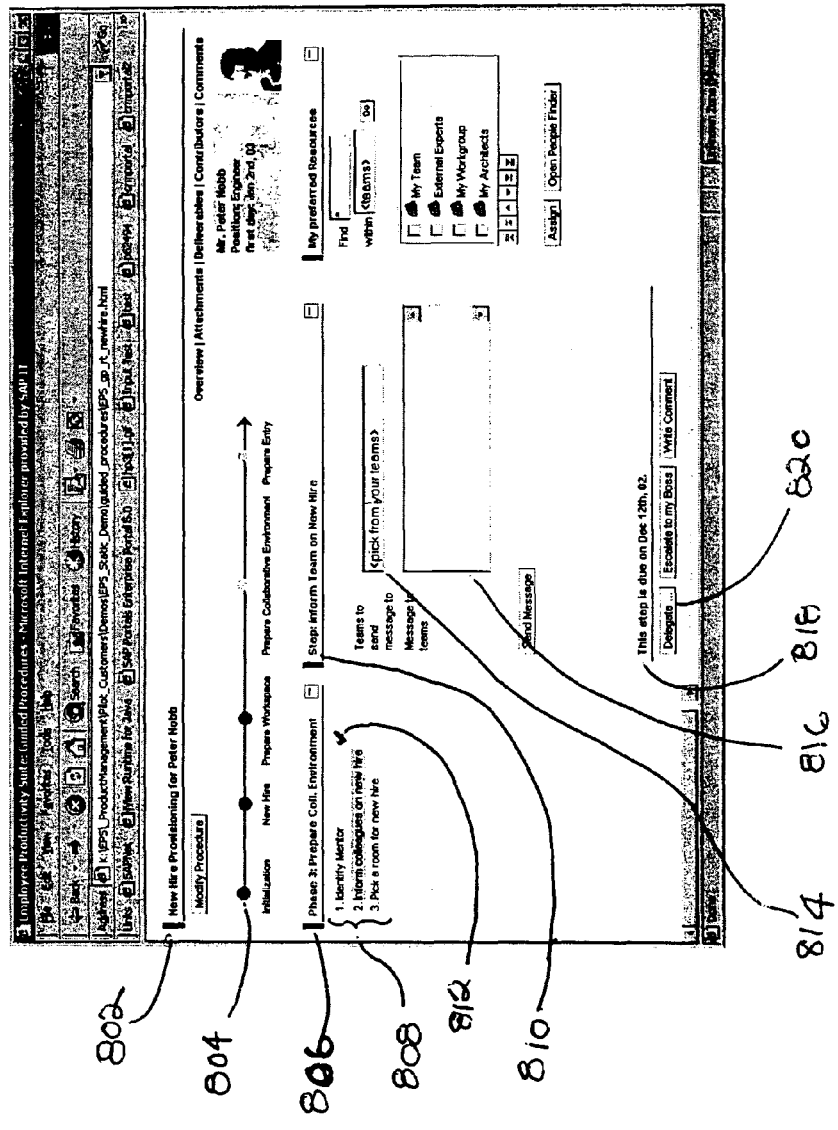
FIG. 8 is an implementation of a process-driven guided procedure tracking display.

FIG. 8 illustrates an implementation of a process-driven view display 800 to monitor the status of a guided procedure. In the process-driven view a user may monitor, depending on permissions, the status of phases, blocks, steps. The process-driven view may include the guided procedure title 802 and an overall status of the phases 804 of the guided procedure. The display may include the phase that is being completed 806 and a list of actions 808 needed to complete the goal. Indicia 812 may be provided to indicate a completed step. Status of an active step 810 may be displayed with a corresponding application or service required to complete the step. The corresponding applications or services that are launched during processing also may be displayed. In the illustrated example, the step 810 requires a notification be sent to team members. The procedure automatically provides an email application that displays a selectable listing 814 of team members and a message area 816. The process-view also may display the due date 818 of the active step. The user also may delegate 820 the processing of the step to another user.

A result-driven view of a procedure also may be used to monitor the status of a guided procedure. In the result-driven view, the monitoring of a guided procedure may be accomplished by tracking the availability of deliverables that must be created to achieve a goal. For example, a manager may be interested in monitoring whether a deliverable is available and may not be interested in the way that an employee completes a step that results in the deliverable.

Figure 9:
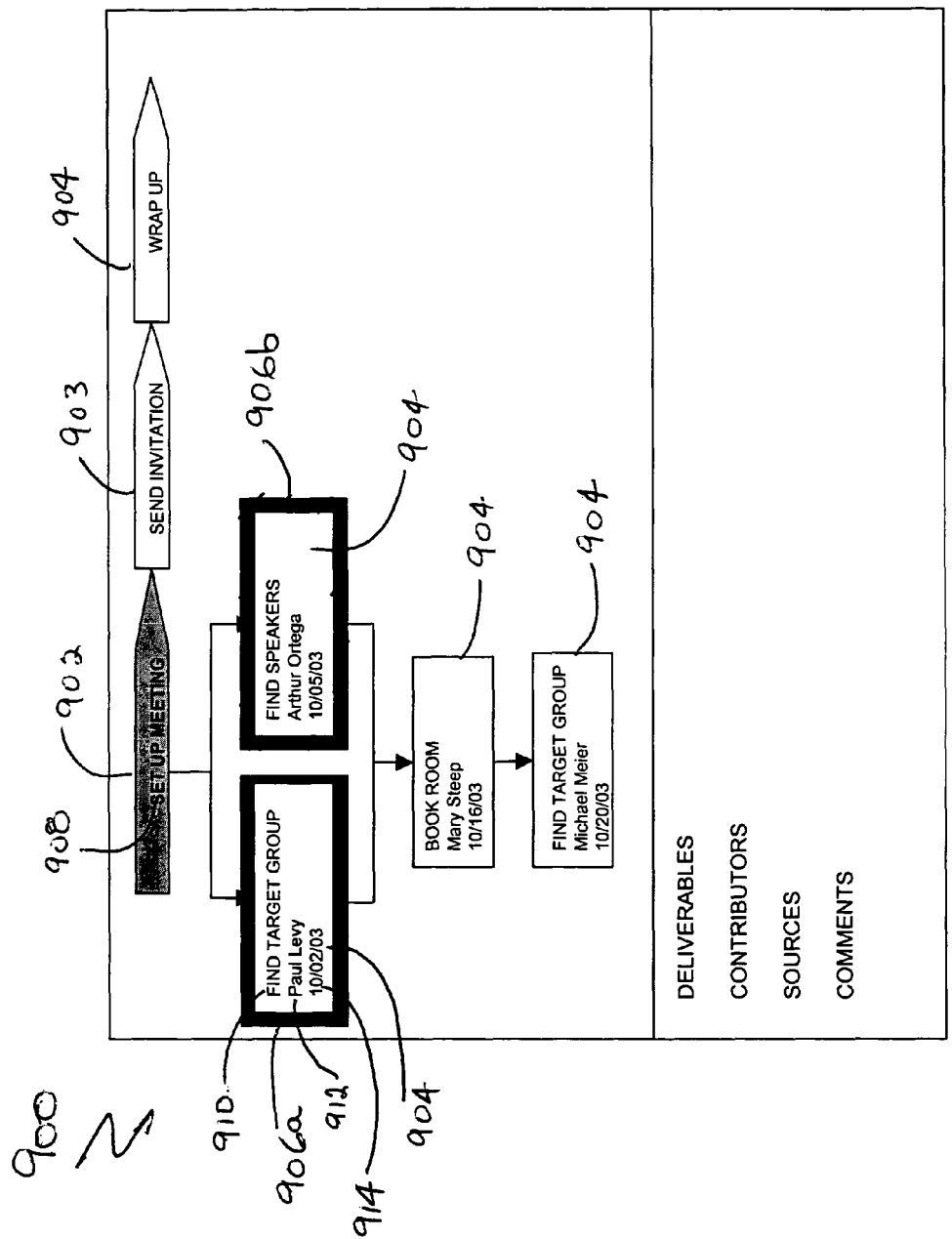
FIG. 9 is an implementation of a procedure-owner guided procedure tracking display.

FIG. 9 illustrates an implementation of a procedure-owner tracking display 900. The display may include the phases 902, 903, 904 of a procedure. A descriptive title 908 of the respective phase may be included. An active phase 902 may be selected to display the sub-tasks 904 of the phase. In an implementation, indicia 906*a*, 906*b* are used to highlight the active steps of the procedure. The indicia 906*a*, 906*b* may be different so as to inform whether the step is being worked on by the procedure owner or a contributor. The steps 904 may include information associated with the step including a title 910, a processor 912 and a due date 914 of the step. The owner of a guided procedure may be enabled to track the status of his guided procedures by (1) monitoring the pending decisions and requests, (2) tracking the contributors, (3) tracking the deliverables, (4) seeing the overall completion rate, (5) getting notifications for different events such as AnyChanges, NewArtifact, Next Phase, NewContributor, and/or (6) directly contacting persons. The owner of a guided procedure may add an overseer with permission to monitor at least some of the procedure dashboard information.

Figure 1:
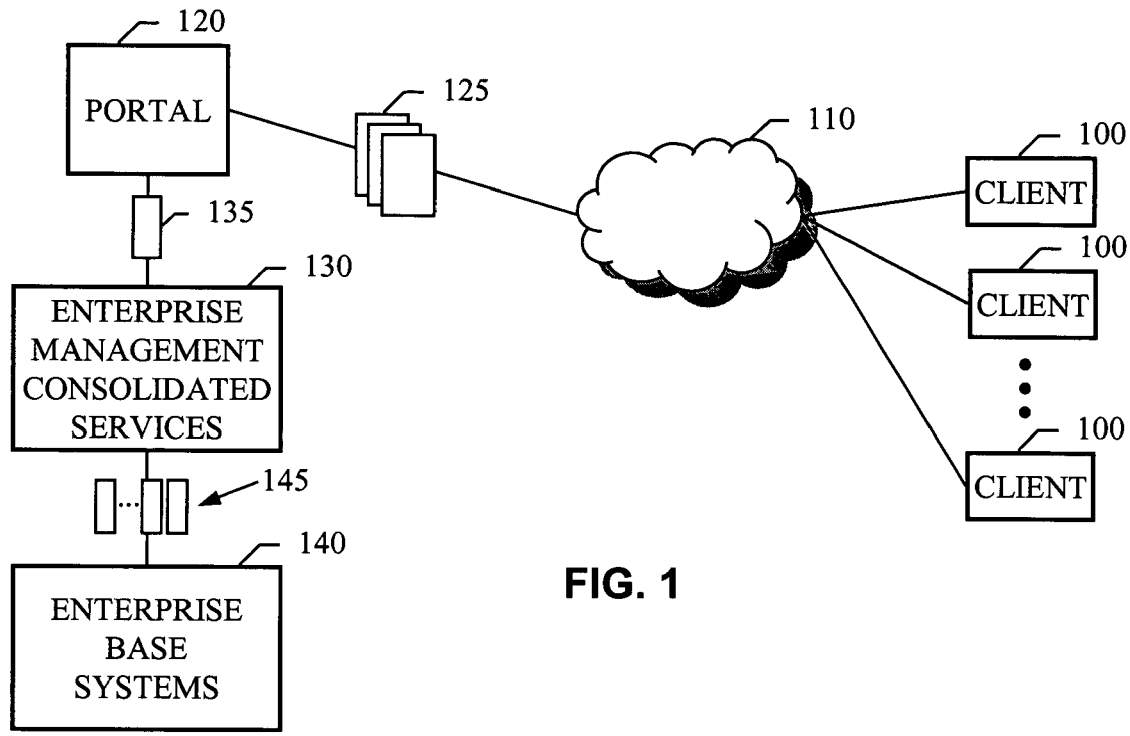
FIG. 1 is a block diagram illustrating an example of an integrated enterprise management system.

FIG. 1 is a block diagram illustrating an example integrated enterprise management system. Multiple clients 100 can access data over a network 110 through a portal 120. The network 110 can be any communication network linking machines capable of communicating using one or more networking protocols, e.g., a local area network (LAN), a wide area network (WAN), an enterprise network, a virtual private network (VPN), and/or the Internet. The clients 100 can be any machines or processes capable of communicating over the network 110. The clients 100 can be Web Browsers and optionally can be communicatively coupled with the network 110 through a proxy server (not shown).

A portal 120 provides a common interface to program management services. The portal 120 receives requests from the clients 100 and generates information views 125 (e.g., Web pages) in response. The portal 120 can implement a user roles-based system to personalize the common interface and the information views 125 for a user of a client 100. A user can have one or more associated roles that allow personalized tailoring of a presented interface through the generated information views 125.

The portal 120 communicates with an enterprise management system 130 that consolidates multiple application services. The portal 120 receives data 135 from the enterprise management system 130 for use in fulfilling the requests from the clients 100. The enterprise management system 130 can provide integrated application services to manage business objects and processes in a business enterprise. The business objects and processes can be resources (e.g., human resources), development projects, business programs, inventories, clients, accounts, business products, and/or business services.

The enterprise management system 130 communicates with enterprise base systems 140 to obtain multiple types of data 145. The enterprise base systems 140 can include various existing application services, such as human resource management systems, customer relationship management systems, financial management systems, project management systems, knowledge management systems, business warehouse systems, time management systems, and electronic file and/or mail systems. The enterprise base systems 140 also can include an integration tool, such as the exchange Infrastructure provided by SAP, that provides another level of integration among base systems. The enterprise management system 130 can consolidate and integrate the data and functionality of such systems into a single enterprise management tool.

This enterprise management tool can include systems and techniques to facilitate creation of new applications within the enterprise management system 130. These new applications, referred to as cross-functional or composite applications, can readily draw on the resources of the enterprise base systems 140 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 130 using customized cross-functional applications. The stages can provide and consume determined services that can be integrated across multiple disparate platforms.

The portal 120, enterprise management system 130 and enterprise base systems 140 can reside in one or more programmable machines, which can communicate over a network or one or more communication busses. For example, the base systems 140 can reside in multiple servers connected to an enterprise network, and the portal 120 and the enterprise management system 130 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 2:
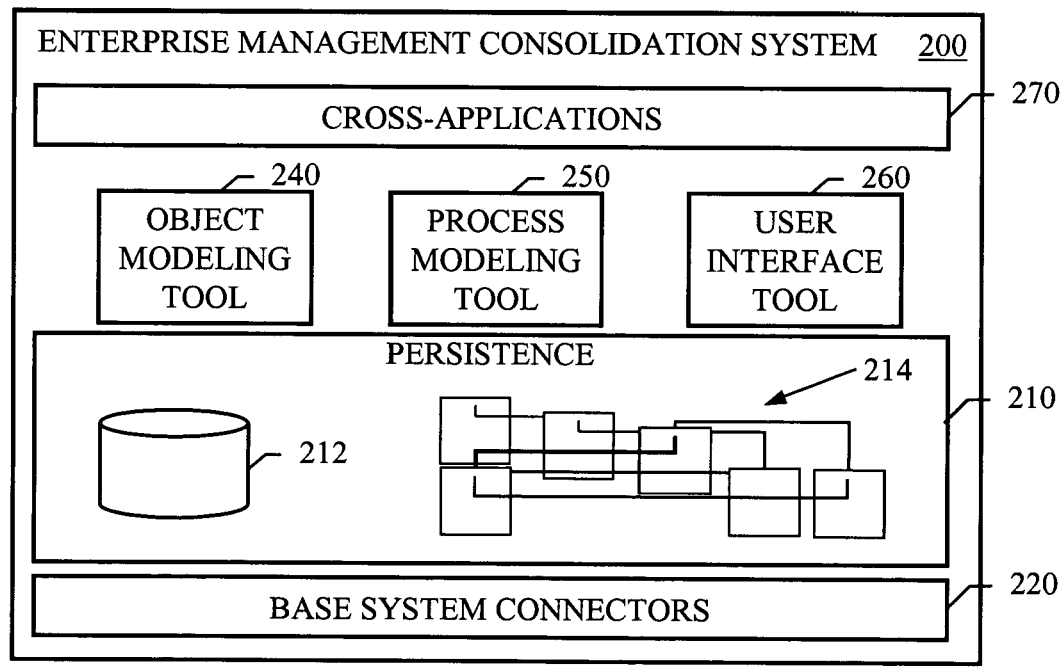
FIG. 2 is a block diagram illustrating components of an example enterprise management consolidation system.

FIG. 2 is a block diagram illustrating components of an example enterprise management consolidation system 200. The system 200 can include a persistence layer 210 and one or more base system connectors 220. The base system connectors 220 enable data exchange and integration with base systems. The base system connectors 220 can include a BC (Enterprise Connector) interface, an ICM/ICF (Internet Communication Manager/Internet Communication Framework) interface, an Encapsulated PostScripts® (EPS) interface, or other interfaces that provide Remote Function Call (RFC) capability.

The persistence layer 210 provides the enterprise management consolidation system 200 with its own database 212 and data object model 214. The database 212 and the object model 212 provide a consolidated knowledge base to support multiple enterprise management functions, including functions created as cross-applications 270. Active communication between the persistence layer 210 and the base systems can provide a tight linkage between real-time operational data from multiple base systems and an integrated enterprise analysis tool to allow strategic enterprise management and planning.

The data object model 214 can represent a subset of data objects managed by the base systems. Not all of the data aspects tracked in the base systems need to be recorded in the data object model 214. The data object model 214 may have defined relationships with data objects stored in the base systems, for example, certain objects in the data object model 214 may have read-only or read-write relationships with corresponding data objects in the base systems. These types of defined relationships can be enforced through the communication system built between the persistence layer 210 and the base systems. Thus, the persistence layer 210 can be used to effectively decouple application development from the underlying base systems.

The cross-functional applications 270, which take advantage of this decoupling from backend systems to drive business processes across different platforms, technologies, and organizations, can be created using a set of tools or frameworks that enable efficient development of cross-functional applications 270. The Guided Procedure Framework can be one component that can enable cross-functional applications that take advantage of the decoupling of the backend systems. The Guided Procedure Framework can support semi-structured processes, aggregate and contextualize information, handle event-driven and knowledge-based scenarios, and support a high degree of collaboration in teams, including driving collaboration and transactions. The set of tools enable efficient development of the cross-functional applications 270 by providing application patterns that support model-driven composition of applications in a service-oriented architecture.

An object modeling tool 240 enables creation of new business objects in the persistency layer 210 by providing a mechanism to extend the data object model 214 dynamically according to the needs of an enterprise. In the object model, Guided Procedure templates can be associated with an object class. A process modeling tool 250 enables creation of new business workflow and ad hoc collaborative workflow. A user interface (UI) tool 260 provides UI patterns that can be used to link new objects and workflow together and generate standardized views into results generated by the cross-functional applications 270. The object modeling tool 240, the process modeling tool 250 and the UI tool 260 thus can be used to build the components of cross-applications 270 to implement new enterprise management functions without requiring detailed coding activity.

The process modeling tool 250 can include guided procedure templates with pre-configured work procedures that reflect best practices of achieving a work objective that is part of a larger cross-functional application scenario. Such a work procedure can include contributions from several people, creation of multiple deliverables, and milestones/phases. A deliverable can be an artifact, expected result or output returned by an action. Moreover, whenever an instantiated business object or work procedure has lifetime and status, the progress and status of the object or work procedure can be made trackable by the process owner or by involved contributors using a dashboard that displays highly aggregated data. The dashboard and a myOngoingWork place can be two UI patterns that are provided by the UI tool 260.

Whenever there is a concept of myObjects, myRecentObjects, myRelatedObjects or myPreferredObjects, then an Object Picker UI pattern, provided by the UI tool 260, can be included that let users pick their favorite object directly. In the Guided Procedures Framework, MyTemplates can be a set of personalized or preferred templates which may searched and selected when instantiating a guided procedure. The templates may be created according to a user's workflow without specialized software skills. The templates may be arranged for single work steps or entire business processes. The templates may be self-adapting based on collaborative filtering (i.e., what users are usually doing) and history tracking (i.e., what a particular user usually does). Whenever people are to be searched for, either for choosing one individual person or for generating a collection of people meeting some criterion, the resource finder concept should be applied. A key aspect of searching for a person can be described as an attribute within the user's activity, qualification, interest, and collaboration profile. For a given cross-application scenario, people collections can be stored as personal or shared collections using the Resource finder to make them available for further operations later on. The Guided Procedures Framework can use the Resource finder pattern at both design-time and run-time to determine and select available persons for collaborative services including discussion forums and voting. The Resource finder may be used for delegating and requesting work contribution from co-workers for single work steps or entire business processes.

Whenever there is a strategic view on a cross-functional application scenario, analytics of the overall portfolio can be made available in the form of a collection of UI components. A view selector can be used to display/hide components, and a component can be toggled between graphical and numerical display and can include a drop-down list or menu to select sub-categories or different views. A strategic view of a guided procedure template may include metrics, for example, frequency of use, average temporal duration, efficiency number of breakdowns, or iterations and quality of outcome. An accomplish view of a guided procedure may show the difference between two dates. The accomplish view may show the accomplishments of the guided procedure including, for example, completed steps, steps that are started but not completed and deliverables. A forecast view of a guided procedure may be used to show the steps that have to be completed. The forecast view may be used for personal forecasting of actions and resources. The forecast view can use the average duration of steps to predict completion dates and aid in the allocation of resources and alignment of personal plans. A procedure tree view may used to display the hierarchy of procedures and sub-procedures. A delta view may be provided to display the difference between the current accomplish view and an accomplish view from a previous time.

Cross-functional application scenarios can provide related information to the user when possible, and some parts within a larger guided procedure scenario can define what kind of related information is to be offered. Heuristics can be used to identify such relatedness, such as follows: (1) information that is related to the user due to explicit collaborative relationships such as team/project membership or community membership; (2) information that is similar to a given business object in a semantic space based on text retrieval and extraction techniques; (3) recent or current objects/procedures of a user; (4) other people doing the same or similar activity (using same object or procedure template, having same workset); (5) instances of the same object class; (6) next abstract or next detailed class; (7) explicit relationships on the organizational or project structure; (8) proximity on the time scale; (9) information about the underlying business context; (10) information about the people involved in a collaborative process; and/or (11) guided procedure context awareness.

Cross-functional applications also can include generic functionality in the form of ControlCenter Pages that represent generic personal resources for each user. The Guided Procedures Framework can refer to the following pages where appropriate: (1) MyOngoingWork page: provides access to a dashboard that lets users track instantiations of ongoing guided procedures. Ongoing work may refer to the state of business objects as well as guided procedures. (2) MyDay page: lists today's time based events that are assigned or related to the user. MyDay page can include time-based events originating from Guided Procedures including due dates, deadlines for phases and deliverables. (3) MyMessageCenter page: Displays all pushed messages and work triggers This page may include received collaborative messaging such as requests, notifications and task assignments. (4) MyInfo: Provides access to all personal info collections (documents, business objects, contacts) including those located in shared folders of teams and communities of which the user is a member. Also provides targeted search in collaborative information spaces such as team rooms, department home pages, project resource pages, community sites, and/or personal guru pages.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments may be within the scope of the following claims.

What is claimed is:

1. A computer-implemented method for processing procedures, comprising:
    associating, using a computer, actions with the procedures and resources with the actions;
    generating, by a computer, an action order indicating whether two or more of the actions are to be performed in an order-dependent manner or in an order-independent manner;
    presenting a list of the actions on a display to a user;
    receiving, by a computer, a user-entered command to perform at least one of the actions using the resources associated with the actions;
    displaying, on a display device, entries indicating status information of procedures, wherein at least one of the displayed entries is marked with a pending-flag to alert the user that the procedure associated with the marked entry has a pending action that has not been completed and that a next action depends on the completion of the pending action; and
    receiving, by a computer, a user-entered command to link at least one of the procedures to at least one pre-existing procedure definition such that subsequent modifications made to the linked procedure definition after linking are automatically reflected in the linked procedure.

2. The method of claim 1, wherein the actions are identified by process patterns associated with the procedures.

3. The method of claim 1, further comprising:
    identifying one or more common action patterns;
    abstracting each reusable common action pattern; and
    providing a template including the abstracted patterns for the procedures based on business context.

4. The method of claim 3, further comprising enabling the user to modify the template with ad-hoc collaboration actions based on work practice for a particular business scenario.

5. The method of claim 4 wherein modification of the template is aided by a wizard.

6. The method of claim 3, further comprising automatically adapting the template based on collaborative filtering or history tracking.

7. The method of claim 1, wherein the action makes a process pattern plug&execute by launching web-based services with semantics and functionality.

8. The method of claim 1, further comprising introducing rules and pre-configuring ad-hoc coordination patterns to handle exceptions and dependencies within actions.

9. The method of claim 8 further comprising providing a hybrid service that encapsulates transactional enterprise services and the related exception handling.

10. The method of claim 1 wherein an action launches an enterprise service directly or dissolves the service through a request to an UDDI server.

11. The method of claim 1 further comprising instantiating sub-procedures from the procedures.

12. The method of claim 11 wherein the procedures control the sub-procedures including stopping, freezing, and waiting for the sub-procedure.

13. The method of claim 1 wherein the actions are grouped into phases.

14. The method of claim 13 wherein a navigation model includes a phase indicator to navigate by phases of the procedure and display of actions and deliverables associated with the phase.

15. The method of claim 13 wherein the completion of a phase is a gate in a process that requires satisfaction of conditions from a higher level semantic before completion of the phase.

16. The method of claim 1 further comprising enabling a user to include ad-hoc collaboration actions.

17. The method of claim 16 wherein the ad-hoc collaboration actions comprise delegating a procedure or portion thereof, delegating an action that has been started, requesting approval, requesting a review or getting an opinion of another user.

18. The method of claim 1 further comprising associating deliverables, contributors and resources with an action.

19. The method of claim 18 further comprising providing displays for tracking the status of deliverables, contributors, resources, metrics, accomplish view, forecast view, procedure tree view, or delta view.

20. The method of claim 19 wherein the metrics are displayed and comprise frequency of use, average temporal duration, efficiency, number of breakdowns, iterations and quality of outcome.

21. The method of claim 19 wherein the accomplish view is displayed and comprises new deliverables, completed steps, steps started but not yet completed or the difference between two action completion dates.

22. The method of claim 19 wherein the delta view is displayed and provides a display comprising the differences between an accomplish from a first time and an accomplish view from a second time.

23. The method of claim 19 further comprising providing aggregated status information to another application or user interface pattern.

24. The method of claim 1 further comprising specifying whether an action is optional, mandatory, or protected.

25. The method of claim 1 further comprising enabling the user to specify that the procedures require collaboration among two or more contributors.

26. The method of claim 1 further comprising enabling the user to determine a guided procedure trigger.

27. The method of claim 1 further comprising enabling the user to back track to previous actions.

28. The method of claim 1 further comprising automatically invalidating procedures in selected cases where the guided procedure trigger ceases to exist.

29. The method of claim 1, wherein the procedures displayed on the display device are procedures to which the user is a contributor, or procedures that the user has selected to monitor.

30. A hardware system comprising one or more computers, configured to process procedures, the system comprising:
    means for associating actions with the procedures and resources with the actions;
    means for generating an action order indicating whether two or more of the actions are to be performed in an order-dependent manner or in an order-independent manner;
    means for presenting a list of the actions to a user;
    means for receiving a user-entered command to perform at least one of the actions using the resources associated with the actions;
    means for displaying entries indicating status information of procedures, wherein at least one of the displayed entries is marked with a pending-flag to alert the user that the procedure associated with the marked entry has a pending action that has not been completed and that a next action depends on the completion of the pending action; and
    means for receiving a user-entered command to link the at least one of the procedures to at least one pre-existing procedure definition such that subsequent modifications made to the linked procedure definition after linking are automatically reflected in the linked procedure.

31. The hardware system of claim 30, wherein the actions are identified by process patterns associated with the procedures.

32. The hardware system of claim 30, further comprising:
means for identifying one or more common action patterns;
means for abstracting each reusable common action pattern; and
means for providing a template including the abstracted patterns for the procedures based on business context.

33. The hardware system of claim 32, further comprising means for enabling the user to modify the template with ad-hoc collaboration actions based on work practice for a particular business scenario.

34. The hardware system of claim 33, further comprising means for enabling the user to automatically adapt the template based on collaborative filtering or history tracking.

35. The hardware system of claim 30, wherein the action makes a process pattern plug&execute by launching web-based services with semantics and functionality.

36. The hardware system of claim 30, further comprising means for enabling the user to introduce rules and pre-configure ad-hoc coordination patterns to handle exceptions and dependencies within actions.

37. The hardware system of claim 30, further comprising means for enabling the user to instantiate sub-procedures from the procedures.

38. The hardware system of claim 37, wherein the procedures control the sub-procedures.

39. The hardware system of claim 30 further comprising means for enabling a user to include ad-hoc collaboration actions.

40. The hardware system of claim 30 further comprising means for providing displays for tracking the status of deliverables, contributors, resources, metrics, accomplish view, forecast view, procedure tree view, or the completion of the procedure.

41. The hardware system of claim 30, wherein the displayed procedures are procedures to which the user is a contributor, or procedures that the user has selected to monitor.

42. An article comprising a machine-readable medium storing instructions operable to cause one or more machines to perform operations comprising:
associating, using a computer, actions with procedures and resources with the actions;
generating, by a computer, an action order indicating whether two or more of the actions are to be performed in an order-dependent manner or in an order-independent manner;
presenting a list of the actions on a display to a user;
receiving, by a computer, a user-entered command to perform at least one of the actions using the resources associated with the actions;
displaying, on a display device, entries indicating status information of procedures, wherein at least one of the displayed entries is marked with a pending-flag to alert the user that the procedure associated with the marked entry has a pending action that has not been completed and that a next action depends on the completion of the pending action; and
receiving, by a computer, a user-entered command to link at least one of the procedures to at least one pre-existing procedure definition such that subsequent modifications made to the linked procedure definition after linking are automatically reflected in the linked procedure.

43. The article of claim 42, wherein the actions are identified by process patterns associated with the procedures.

44. The article of claim 42, further comprising storing instructions operable to cause one or more machines to perform operations comprising:
identifying one or more common action patterns;
abstracting each reusable common action pattern; and
providing a template including the abstracted patterns for the procedures based on business context.

45. The article of claim 44, further comprising storing instructions operable to cause one or more machines to perform operations comprising enabling the user to modify the template with ad-hoc collaboration actions based on work practice for a particular business scenario.

46. The article of claim 45, further comprising storing instructions operable to cause one or more machines to perform operations comprising automatically adapting the template based on collaborative filtering or history tracking.

47. The system of claim 42, wherein the action makes a process pattern plug&execute by launching web-based services with semantics and functionality.

48. The article of claim 42, further comprising storing instructions operable to cause one or more machines to perform operations comprising introducing rules and pre-configuring ad-hoc coordination patterns to handle exceptions and dependencies within actions.

49. The article of claim 42, further comprising storing instructions operable to cause one or more machines to perform operations comprising instantiating sub-procedures from the procedures.

50. The system of claim 49, wherein the procedures control the sub-procedures.

51. The article of claim 42, further comprising storing instructions operable to cause one or more machines to perform operations comprising including ad-hoc collaboration actions.

52. The article of claim 42, further comprising storing instructions operable to cause one or more machines to perform operations comprising providing displays for tracking the status of deliverables, contributors, resources, metrics, accomplish view, forecast view, procedure tree view, or the completion of the procedure.

53. The article of claim 42, wherein the displayed procedures are procedures to which the user is a contributor, or procedures that the user has selected to monitor.

54. An enterprise management consolidation hardware system comprising:
a cross-functional module to provide communication between at least one of an object modeling tool, a process modeling tool, or a user interface tool, wherein the user interface tool comprises:
means for associating actions with procedures and resources with the actions;
means for generating an action order indicating whether two or more of the actions are to be performed in an order-dependent manner or in an order-independent manner;
means for presenting a list of the actions to a user;
means for receiving a user-entered command to perform at least one of the actions using the resources associated with the actions;

means for displaying entries indicating status information of procedures, wherein at least one of the displayed entries is marked with a pending-flag to alert the user that the procedure associated with the marked entry has a pending action that has not been completed and that a next action depends on the completion of the pending action; and means for receiving a user-entered command to link the at least one of the procedures to at least one pre-existing procedure definition such that subsequent modifications made to the linked procedure definition after linking are automatically reflected in the linked procedure.

55. The enterprise management consolidation hardware system of claim 54 wherein the user interface tool further comprises means for associating deliverables, contributors, and resources with an action.

56. The enterprise management consolidation hardware system of claim 55 wherein the user interface tool further comprises means for communicating with a resource finder to locate contributors.

57. The enterprise management consolidation hardware system of claim 54 wherein the tool further comprises means for communicating with a community membership site.

58. The enterprise management consolidation hardware system of claim 54 wherein the tool further comprises means for communicating with a personal guru page.

59. The enterprise management consolidation hardware system of claim 54, wherein the displayed procedures are procedures to which the user is a contributor, or procedures that the user has selected to monitor.

* * * * *